(12) United States Patent
Ranson et al.

(10) Patent No.: US 8,351,851 B2
(45) Date of Patent: Jan. 8, 2013

(54) SYSTEM AND METHOD FOR FEEDBACK CANCELLATION IN REPEATERS

(75) Inventors: Chris Ranson, Concord, VA (US); Van Hanson, Forest, VA (US); Thomas Kummetz, Forest, VA (US)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 13/416,512

(22) Filed: Mar. 9, 2012

(65) Prior Publication Data
US 2012/0170620 A1    Jul. 5, 2012

Related U.S. Application Data

(63) Continuation of application No. 12/347,098, filed on Dec. 31, 2008, now Pat. No. 8,135,339.

(51) Int. Cl.
 H04B 7/14    (2006.01)
(52) U.S. Cl. ............................................................. 455/24
(58) Field of Classification Search ............... 455/7, 20, 455/21, 22, 23, 24
See application file for complete search history.

(56) References Cited

U.S. PATENT DOCUMENTS

| | | | |
|---|---|---|---|
| 3,085,200 A | 4/1963 | Goodall | |
| 3,086,080 A | 4/1963 | Raisbeck | |
| 3,979,683 A | 9/1976 | Ikeda | |
| 4,363,129 A | 12/1982 | Cohn et al. | |
| 4,383,331 A | 5/1983 | Davidson | |
| 4,561,067 A | 12/1985 | McKeown | |
| 4,701,935 A | 10/1987 | Namiki | |
| 4,776,032 A | 10/1988 | Odate et al. | |
| 5,040,189 A | 8/1991 | Braun | |
| D395,427 S | 6/1998 | Arora et al. | |
| D396,455 S | 7/1998 | Bier | |
| 5,835,848 A | 11/1998 | Bi et al. | |
| D403,673 S | 1/1999 | Arora et al. | |
| D404,386 S | 1/1999 | Mullin et al. | |
| 5,867,792 A | 2/1999 | Ichiyoshi | |
| D432,507 S | 10/2000 | Brockel et al. | |
| 6,141,531 A | 10/2000 | Williams et al. | |

(Continued)

FOREIGN PATENT DOCUMENTS

EP    0905914 A2    3/1999

(Continued)

OTHER PUBLICATIONS

Four-page International Search Report dated Feb. 25, 2010 for PCT/US2009/0066523.

Primary Examiner — Jeffrey Zweizig
(74) Attorney, Agent, or Firm — Wood, Herron & Evans, LLP

(57) ABSTRACT

An apparatus for repeating signals includes a receive antenna for receiving input signals, processing circuitry for processing the input signals to form repeated signals, and a transmit antenna for transmitting the repeated signals. The processing circuitry includes an adaptive digital filter configured to generate cancellation signals that are added to the input signals to cancel unwanted feedback signals from the input signals. A frequency shifting circuit adds a frequency shift to the input signals, after the addition of the cancellation signals, to form repeated signals that are frequency shifted from the input signals. A digital signal processor is coupled to the adaptive digital filter for digitally adapting the filter. The digital signal processor utilizes the frequency shift of the transmission signals to adapt the adaptive digital filter.

26 Claims, 5 Drawing Sheets

U.S. PATENT DOCUMENTS

| | | |
|---|---|---|
| 6,229,992 B1 | 5/2001 | McGeehan et al. |
| 6,253,060 B1 | 6/2001 | Komara et al. |
| D448,777 S | 10/2001 | Kuhlman |
| 6,385,435 B1 | 5/2002 | Lee |
| 6,484,012 B1 | 11/2002 | Nche et al. |
| 6,539,204 B1 | 3/2003 | Marsh et al. |
| 6,684,058 B1 | 1/2004 | Karacaoglu et al. |
| 6,745,003 B1 | 6/2004 | Maca et al. |
| 6,807,399 B1 | 10/2004 | Shim |
| 6,839,539 B2 | 1/2005 | Durrant et al. |
| 6,915,112 B1 | 7/2005 | Sutton et al. |
| 7,035,321 B2 | 4/2006 | Balaberda |
| 7,043,203 B2 | 5/2006 | Miquel et al. |
| D538,213 S | 3/2007 | Fukuyama et al. |
| 7,200,134 B2 | 4/2007 | Proctor, Jr. et al. |
| 7,355,993 B2 | 4/2008 | Adkins et al. |
| 7,398,053 B2 * | 7/2008 | Kerek ............................ 455/20 |
| 7,546,084 B2 | 6/2009 | Kennedy, Jr. et al. |
| 7,558,528 B2 | 7/2009 | King |
| 7,558,575 B2 | 7/2009 | Losh et al. |
| 7,596,352 B2 | 9/2009 | Ding et al. |
| 7,627,287 B2 * | 12/2009 | Moss ............................ 455/16 |
| 7,962,092 B2 * | 6/2011 | Kho et al. .................... 455/11.1 |
| 8,135,339 B2 | 3/2012 | Ranson et al. |
| 2002/0191779 A1 | 12/2002 | Pham |
| 2004/0209571 A1 | 10/2004 | Saegrov |
| 2006/0172781 A1 | 8/2006 | Mohebbi |
| 2007/0161347 A1 | 7/2007 | Ma et al. |

FOREIGN PATENT DOCUMENTS

| | | |
|---|---|---|
| EP | 1109332 A2 | 6/2001 |
| WO | 2007078032 A1 | 7/2007 |
| WO | 2008027531 A2 | 3/2008 |
| WO | 2008140163 A1 | 11/2008 |

* cited by examiner

SYSTEM AND METHOD FOR FEEDBACK CANCELLATION IN REPEATERS

RELATIONS APPLICATIONS

This Application is a continuation of U.S. application Ser. No. 12/347,098, filed Dec. 31, 2008, and entitled "SYSTEM AND METHOD FOR FEEDBACK CANCELLATION IN REPEATERS which application is incorporated herein by reference in its entirety.

FIELD OF THE INVENTION

The present invention is directed generally to repeaters or signal repeating devices for wireless communications, and more particularly to an apparatus and method for attenuating feedback signals received from the transmitter's output.

BACKGROUND OF THE INVENTION

In existing wireless technologies, signal repeating devices, or "repeaters" are used to extend the coverage of the overall wireless system. For example, often such systems consist of a plurality of base stations that communicate with each other and operate to provide a defined coverage area. In such coverage areas, there are often smaller areas that have very low signal reception, such as areas within buildings or areas that are otherwise obstructed. Rather than implementing another costly and large base station to provide coverage to such low signal areas, repeaters are utilized. A repeater essentially has a donor antenna that is in communication with one or more base stations. The repeater receives downlink signals from the base station, processes and amplifies those signals, and then transmits those signals through a coverage antenna into the area that otherwise has low signal reception or low signal power.

For example, referring to FIG. 1, a basic wireless communication system 10 might include a base station 12 that communicates with a repeater 14 having a donor antenna 16, a coverage antenna 18, and processing electronics 20 that are positioned between the antennas to process and amplify the repeated signal. Accordingly, downlink wireless signals 22 are received by the donor antenna 16 of the repeater, and are then repeated through the coverage antenna 18 as downlink signals 22a. The downlink signals 22a are received by one or more wireless communication devices, such as cell phones 24. Similarly, in an uplink direction, as indicated by reference numerals 26 and 26a, the wireless device 24 communicates signals back to the coverage antenna and the repeated signal 26 is then provided as an uplink signal back to the base station 12. As would be readily understood by a person of ordinary skill in the art, such repeater devices 14 can take many different forms.

One performance-limiting characteristic for a repeater is the isolation between the two opposing antennas or sets of antennas. The isolation limits the gain that may be implemented within the repeater 14. The gain generally has to be less than the isolation to ensure stability. For example, if the isolation between the antennas 16, 18 of the repeater 14 is around 60 dB, then the maximum system gain allowed might be around 45-50 dB, which would allow for a 10-15 dB gain margin.

One particular issue to be addressed within a repeater is the feedback signal that comes from the coverage antenna 18 back to the donor antenna 16 (or vice-versa for the uplink traffic). Such feedback signals may come directly from the transmitting antenna as indicated in FIG. 1 as signal 30 or indirectly from reflectors as signal 32, which could be caused by direct coupling between the antennas 16 and 18 or via reflections on surfaces close to the repeater as indicated by reference numeral 32 in FIG. 1. Because the feedback signals 30 and 32 in an on-frequency repeater case are generally the same frequency (neglecting the frequency shift due to the Doppler Effect in case of relative movement between reflectors and repeater antennas) as the input signal 22, it cannot be removed by conventional frequency domain filtering techniques.

To remove the feedback signals 30, 32 without corrupting the desired uplink or downlink signals 22, 26, the feedback signals must be subtracted from any received signal or input signal. Often, the time delay of the signal through the repeater path is long enough to statistically de-correlate the echo from the input signal without affecting system performance. In such a case, adaptive filtering algorithms can be used to attenuate the feedback signal from the repeater. For example, in some existing repeater products, such as the Node C/M/G as provided by Andrew Corporation, A CommScope Company, Hickory, N.C., the symbol rate of the received signal or input signal is fast enough so that the repeater delay is sufficiently long to de-correlate the feedback signal from the incoming signals. However, such a technique for addressing feedback signals is not suitable for all repeaters.

In the case of repeaters that support narrowband signals with a symbol period which exceeds the value of tg/2 (half of the group delay of the repeater), the delay through the repeater is typically not long enough to de-correlate the input signals from the echo signals. As such, a time delay-based adaptive filtering algorithm is not able to distinguish sufficiently between the desired input signals, such as the downlink signals from the base station, and the undesired feedback signal between the transmit and receive antennas of the repeater. For example, for narrowband standards, the date rate or symbol rate through the channel is sufficiently slow, such that it would take around 50-100 microseconds of delay in the repeater to sufficiently de-correlate the feedback signal from the desired input signal. Such an amount of delay could be too high, and could cause intra- or intersymbol interference that could not be tolerated by wireless devices, such as mobile phones, in various overlap areas where the wireless devices can receive signals at similar levels from both the base station and a repeater.

Accordingly, existing techniques in the art that incorporate time delays are unable to provide the necessary cancellation of feedback signals in a repeater system that support signals with a symbol period exceeding half of the repeater group delay.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION OF THE INVENTION

The present invention provides a signal repeating apparatus, or a repeater that provides attenuation of feedback signals received from the transmitter. Particularly, the inventive repeater more efficiently attenuates the feedback signals that are fed from the repeater's transmit antenna back to the receive antenna and consequently preventing the repeater from signal quality degradation or self-oscillation. Processing circuitry for processing input signals of the repeater to form transmission signals includes an adaptive digital filter that is configured to generate cancellation signals that are added to the input signals to cancel the unwanted signals, such as echo signals, from the input signals. The repeater, in one embodiment, uses a frequency shifting circuit to add a frequency shift and form transmission or repeated signals that are frequency shifted from the input signals originally received by the repeater. The digital signal processor that adapts the adaptive digital filter is configured for utilizing the frequency shift for such adaptation, and thus provides an improved cancellation of the echo signals. The present invention is particularly useful within a narrowband environment for repeating narrowband signals as well as in cases where the repeated signals contain narrowband signals among other signals which might be narrower or wider in bandwidth.

Figure 1:
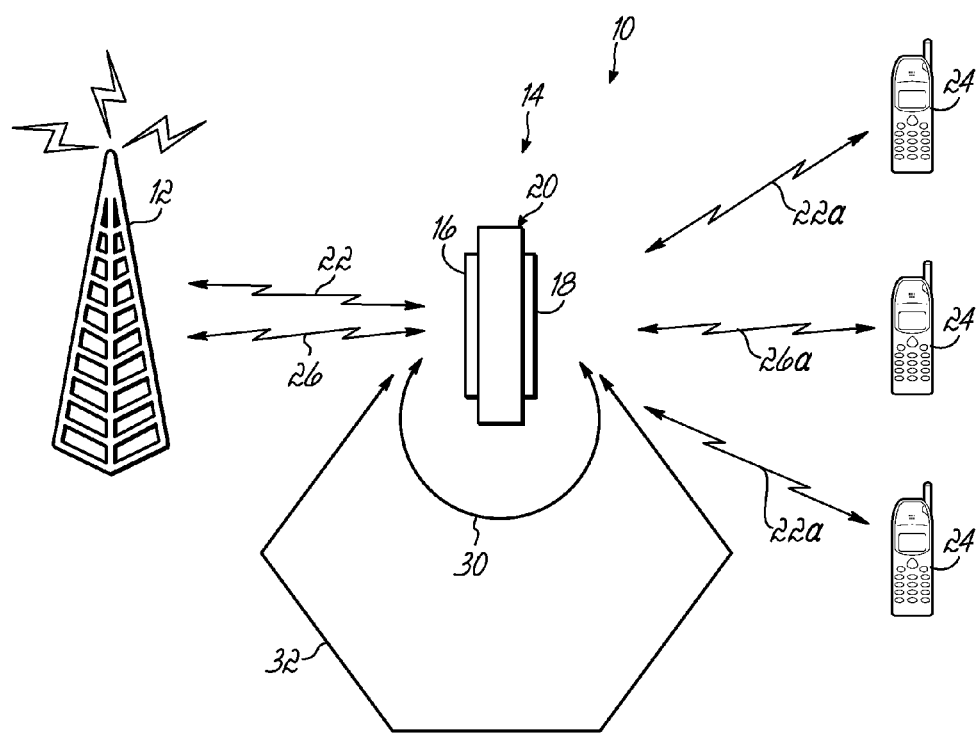
FIG. 1 is a schematic diagram of a repeater utilized within a wireless system for incorporating an embodiment of the present invention.
Figure 2:
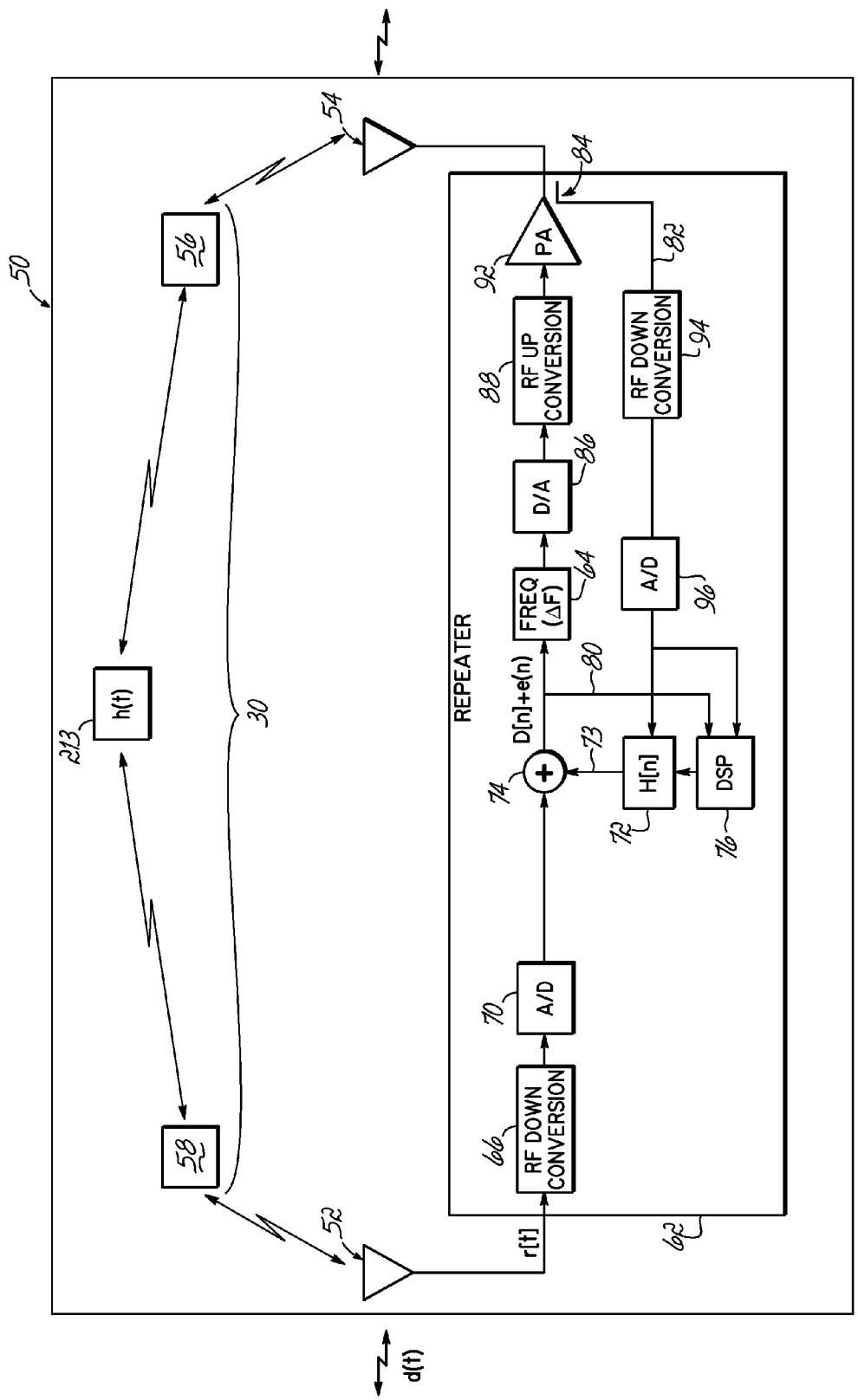
FIG. 2 is a circuit block diagram of a repeater incorporating one embodiment of the present invention.

Referring to FIG. 2, a high level schematic block diagram of one embodiment of the invention is shown. A repeater 50 incorporates a transmit antenna 52 for processing input signals indicated as d(t). The d(t) signals represent the desired signals to be repeated, such as those that are transmitted from a source such as a base station 12 (See FIG. 1). Other sources might also be utilized to generate the desired signals. The echo path 30 is also shown in FIG. 2. The echo path has a transfer function h[t] 213 associated with it that affects the transmission or repeated signals 56 from the transmit antenna 54. The transfer function h(t) represents the transfer function of the entire feedback path formed through several mechanisms: direct antenna coupling, coupling through reflections from distant objects, and scattering and refraction mechanisms. As such, the feedback signal 56 reaches the receive antenna 52 in the form of a feedback signal 58 or i(t), as discussed further hereinbelow. The combination of the desired signal d(t) and the feedback signal i(t) are combined, in open space, and are received by the receive antenna 52 in an additive sense. The combined desired signal d(t) and feedback signal i(t) form the received signal r(t) or the input signals for the repeater. For proper repeating of the input signals, it is, thus, desirable to remove the feedback signal i(t), and only repeat the desired signal d(t). To that end, the processing circuitry 62 that is connected in the path between the antennas 52 and 54 processes the input signals in order to attenuate the feedback signal 58. As may be appreciated, the block diagram of FIG. 1 illustrates a signal path, such as a downlink path through the repeater 50, such as from a base station 12 to a mobile device 24. It would be readily understood by a person of ordinary skill in the art that a return path, such as an uplink path, would similarly process signals from the mobile device 24 back to the base station 12 in order to realize the invention. However, discussion of the signal processing in one path is made herein, with an understanding that generally the similar processing occurs in the signal path in the opposite direction.

In accordance with one aspect of the present invention, the input signals or received signals r(t) are frequency shifted, utilizing a frequency shifting circuit 64 to provide transmission or repeated signals that are frequency shifted from the input signals. That is, the output 56 of the repeater 50 is frequency shifted from the input signals to the repeater. Turning to FIG. 2, the input signals r(t) are downconverted to an intermediate frequency (IF) utilizing an RF downconversion circuit or block 66. The signals are then converted to digital signals utilizing an analog/digital (ND) converter 70. The processing circuitry further includes an adaptive digital filter 72. The adaptive digital filter 72 is configured to generate signals 73 that approximate the additive inverse of the feedback signals 58 that are then added by an adder 74 to the input signals r[t] to cancel or subtract the undesired signals, such as the undesired feedback signals 58, from the input signals r(t). Digital signal processing circuitry or a digital signal processor 76 is coupled to the adaptive digital filter 72, and is operable for digitally adapting the coefficients of the filter. Preferably, filter 72 is adapted to reflect the transfer function H[n] to form the additive inverse of the feedback signal 30 received at the antenna 52. Preferably, the signal from filter 72 is added to the input signals R[n] so that the feedback signals 58 are removed. That is, the signal from filter 72 is subtracted from the input signals to cancel the feedback signal. Since such cancellation is not always complete, there will be some error signal e[n] in the cancellation process. Thus, as illustrated in FIG. 2, while it is desirable to have only the desired signal D[n] after the cancellation at adder 74, the actual signal will be D[n]+e[n]. The digital signal processor (DSP) 76 operates to modify or adapt filter 72 such that the error signal e[n] is minimized. The error signal e[n] will approach zero as the filter converges. The output of the cancellation D[n]+e[n] is fed into the digital signal processor, as indicated by path 80. Similarly, a reference signal is fed back to both the filter 72 and DSP 76 through the reference path 82.

In the embodiment of FIG. 2, the reference path 82 couples a reference signal off of the signal path after a power amplifier 92. A suitable coupler device 84 is utilized to couple off the reference signal. Even though both the desired signal D[n] and the error signal e[n] are fed to the DSP 76, the DSP generally only acts on the error signal e[n] because it is assumed that D[n] has a mean value of zero, and is statistically de-correlated from the feedback signal being cancelled. It is desirable to cancel the entire feedback signal 58, including signals that follow the direct path between the antennas as well as the signals that are reflected off nearby and distant objects. Thus, as discussed further hereinbelow, the adaptive digital filter 72 can be a multi-tap filter that has a multi-order transfer function.

In order to de-correlate the feedback signal 30 from the input signals or received signals r(t), one embodiment of the invention incorporates a frequency shift shown as the frequency shifting circuit 64. Accordingly, the output signal from the cancellation at adder 74 is frequency shifted by ΔF. The frequency shifting circuit adds a frequency shift to thus form transmission or repeated signals that are frequency shifted from the input signals, such as the desired input signals D[n]. The digital repeated signals are converted back to analog utilizing a digital/analog converter (D/A) 86, and then are upconverted back to a suitable RF frequency by RF Upconversion block 88. The signals are then amplified with a power amplifier 92, and transmitted through the transmit antenna 54. It will be appreciated that the reference path 82 for the embodiment of FIG. 2 will downconvert the coupled signal using RF Downconversion block 94 before digitizing the reference signal with ND 96 before it is fed to both the adaptive digital filter 72, and the DSP 76. As such, the transmission or repeated signal is reflected in FIG. 2 by reference number 56. Reflective of the transfer function h(t) 213 of the echo path, the feedback signal is then shown in FIG. 2 by reference number 58.

Figure 2A:
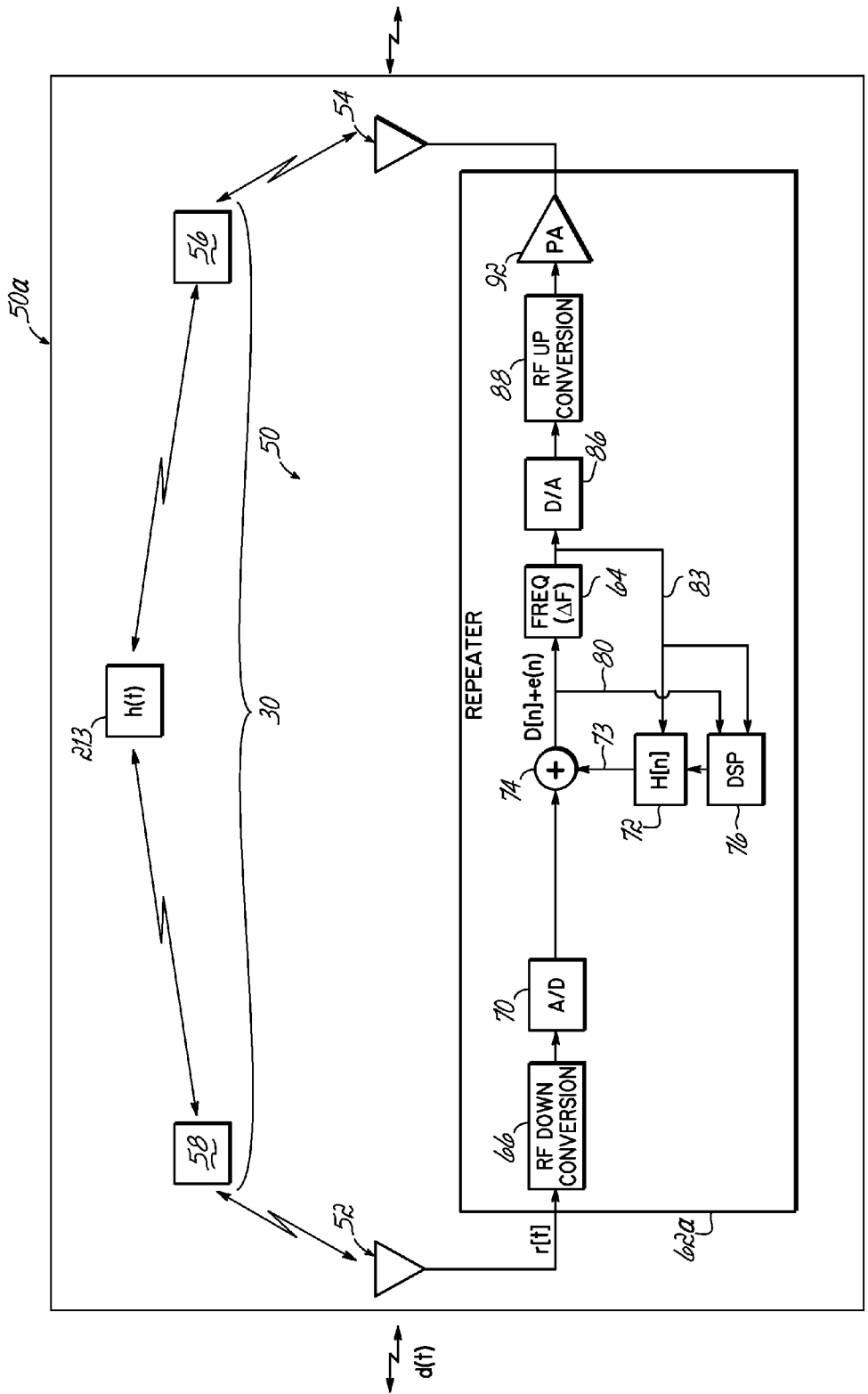
FIG. 2A is a circuit block diagram of a repeater incorporating one embodiment of the present invention.

FIG. 2A illustrates another embodiment of a repeater 50a incorporating features of the invention. Repeater 50a includes circuitry 62a that shares like reference numerals with FIG. 2 and circuitry 62 for like components. In the embodiment of FIG. 2A, the reference path 83 is coupled off digitally between the combiner 74 and D/A 86, rather than after the power amplifier 92, as shown in FIG. 2.

Figure 3:
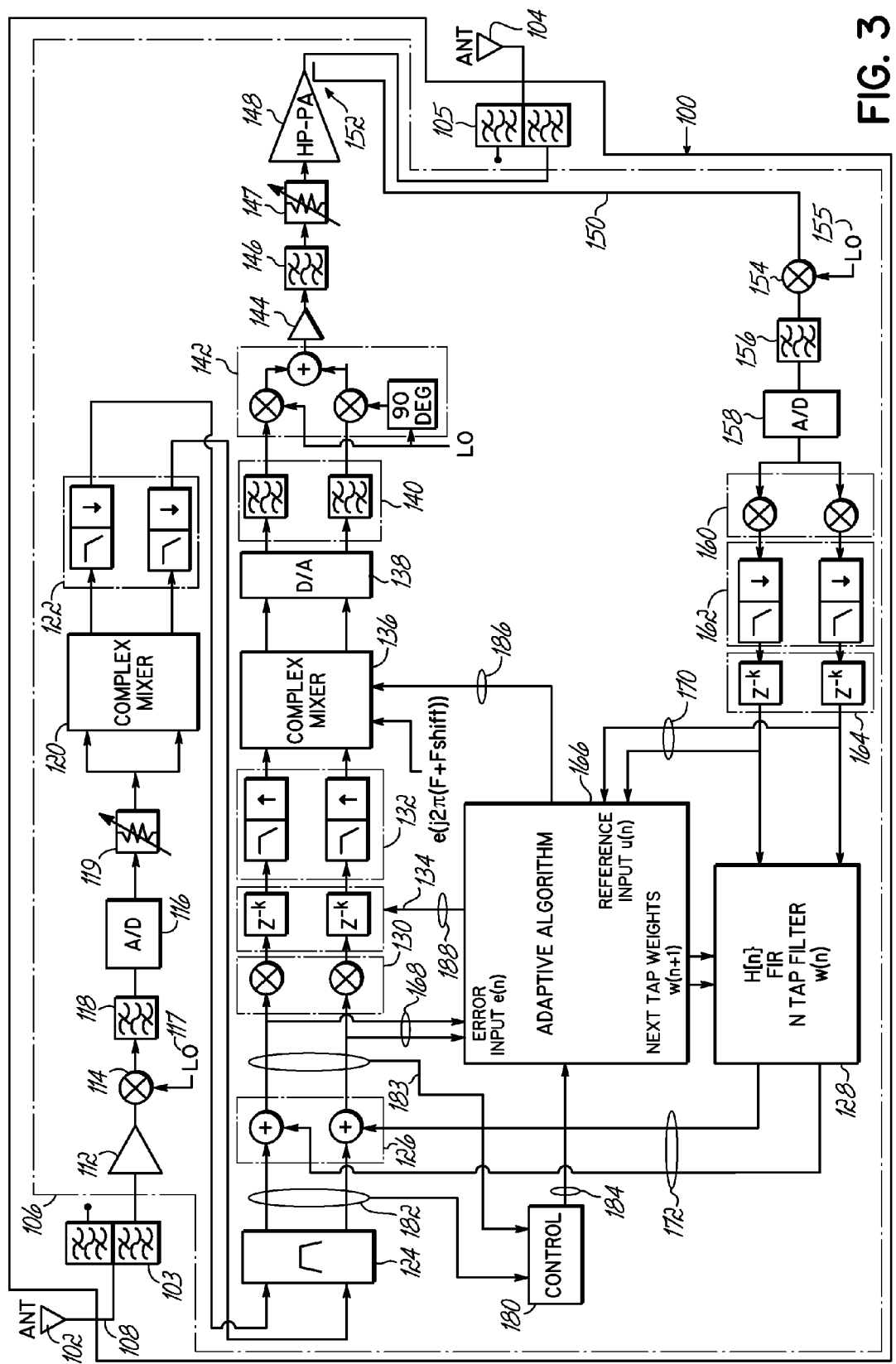
FIG. 3 is another circuit block diagram illustrating a repeater incorporating an embodiment of the present invention.

FIG. 3 illustrates a more detailed block diagram of one embodiment of the present invention, such as illustrated in FIG. 2. The repeater 100 of the present invention includes an antenna 102, which represents a receive antenna for the downlink (D.L.) and a transmit antenna for the uplink (U.L.), and an antenna 104, which represents a transmit antenna for the downlink and a receive antenna for the uplink, with processing circuitry or electronics 106 therebetween. The downlink path 108 is indicated. As noted above, the repeater will also have an uplink path (not shown) from a mobile device back to the base station. When the repeater is utilized to extend the coverage of a base station, the antenna 102 might be considered the base station antenna, whereas the antenna 104 might be considered the coverage antenna. Alternatively, the receive antenna 102 might also be termed a pick-up, link, or donor antenna, whereas the transmit antenna might also be considered the mobile antenna.

Generally, each antenna will be associated with a duplexer or other signal splitting device that segregates the uplink and downlink signals according to their frequencies. As such, the respective duplexers 103 and 105 of the antennas 102, 104, are utilized to ensure that the uplink and downlink traffic is processed properly, with proper isolation between the uplink and downlink paths. Generally, since the uplink and downlink paths are similar in their repeater implementation, for the purposes of this invention, the downlink path 108 will be described in detail, with the understanding that the uplink path will operate generally in a similar fashion but in the opposite direction.

Referring to the signal path 108, generally the RF signal received by receive antenna 102 is conditioned for subsequent processing. A low noise amplifier (LNA) 112 amplifies the signal with a very low noise figure in order that the overall noise figure of the repeater is kept low. A mixer 114 uses local oscillator signal (LO) 117 to downconvert the receive signals to a suitable intermediate frequency (IF) that is compatible with an ND converter 116. A filter 118 generally follows the mixer to remove any desired mixing products, and to remove the LO 117 that leaks through the mixer. Filter 117 also performs as an anti-aliasing filter before digitization by the A/D converter 116. Alternatively, a downconversion scheme incorporating a quadrature mixer could be used that provides a complex analog output consisting of an inphase and a quadrature signal at an intermediate frequency (IF) or even, in case of direct downconversion, at baseband. In this case, the A/D converter requires two inputs for the complex analog signal.

After the RF signal is processed, the ND converter 116 converts the analog continuous-time signal into a discreet-time digital signal. After the signal is digitized, a complex mixer 120 mixes the received signals to digital baseband and decomposes the digital signal into its in-phase and quadrature components thereby representing the complex envelope of the desired signal. This step might not be required if a direct downconversion scheme is used in the analog front end. Prior to digital conversion, a variable attenuator 119 might be utilized to optimize the dynamic range of the ND converter 116. A decimation filter may be used to reduce the sample rate to make the subsequent signal processing more efficient. The channel filter 124 is configured to only pass the desired frequencies of interest, and to attenuate all other frequencies. The filter performs the frequency channelization for the repeater 100. Alternatively, a multiband filter could be used to pass a multitude of desired signals.

A cancellation combiner 126 is utilized to remove the feedback signals, from the desired signal D[n], as discussed further hereinbelow. The cancellation combiner 126 acts as an adder that will subtract the outputs of filter 128. The filter, represented by H[n] is adaptable to converge to a desired transfer function to remove the echo once the output of the filter is combined through the cancellation combiner 126, as discussed further hereinbelow.

The remaining signal after the cancellation combiner 126 is preferably the desired signal D[n] and a small error signal e[n]. The filter is made to converge adaptively to minimize the error signal. A gain circuit 130 provides digital gain adjustment for the repeater, and a digital interpolator 132 may be used to interpolate the filtered signal which may or may not have been decimated.

In accordance with another aspect of the present invention, signal path 108 might also include a time delay circuit 134 that introduces a time delay into the transmitted signal. Such a time delay is in addition to a frequency shift ΔF, as implemented in one aspect of the present invention, as discussed herein. The signal output from the cancellation combiner will be transmitted as a transmit signal from antenna 104. As such, time delaying that signal through a time delay circuit 134 will further assist in the de-correlation of the feedback signals I[n] from the desired signal D[n].

Utilizing the complex mixer 136, the signal is mixed up to the desired IF before being sent to the D/A converter 138. In accordance with one aspect of the present invention, the complex mixer imposes the frequency shift ΔF on the repeated signal. The frequency shift ΔF thus provides a transmitted signal that is frequency shifted from the input signal to the repeater on path 108. As a result, that frequency shift ΔF enables the digital signal processing circuitry 106 of the invention to de-correlate the feedback signals from the desired input signals. As may be appreciated, the frequency shifted transmitted signal will be received as feedback signals by antenna 102 containing both the direct antenna-to-antenna signals, and also indirect reflected signals. As such, the feedback signals are frequency shifted from the desired signals D[n] to enable sufficient de-correlation, and ultimately cancellation, of those echo signals. The value of the frequency shift that is required depends on various factors. First, the frequency shift needs to be high enough to provide sufficient decorrelation of the output at antenna 104 or 54 to the input D(t) for a maximum of decorrelation. Secondly, the frequency shift needs to be low enough to still allow the mobile to operate without a noticeable degradation in performance. As noted herein, the repeater operates to repeat signals in both a downlink (DL) and uplink (UL) direction. In order to minimize the effect on the mobile communication the UL frequency shift could be of the same amount but opposite sign as the DL frequency shift. Thus, the BTS would not see any significant shift of the mobile transmit frequency due to the repeater.

As discussed further hereinbelow, the complex mixer 136 may be dynamically controlled, such as to dynamically vary the frequency shift ΔF and/or to synchronize that frequency shift with the adaptation of filter 128 provided by the present invention. As such, the present invention can take advantage of certain signal processing conditions and signal traffic conditions in order to improve the performance of repeater 100.

D/A converter 138 converts the discreet time signal back to a continuous time signal. Filter 140 acts as a reconstruction filter for the D/A converter 138, and effectively removes the images that are inherently generated as a result of the conversion process. A quadrature mixer and combiner 142 performs a quadrature upconversion of the signals to their original RF frequencies (plus the small frequency shift ΔF), where they are then pre-amplified by amplifier 144 and are filtered by filter 146 to remove any sideband images and LO leakage. A high power-power amplifier (HP-PA) 148 is responsible for the final gain provided by the repeater to transmit the repeated signal at the desired power level. The PA 148 is preferably a linear power amplifier. A variable attenuator 147 might be utilized prior to the PA 148 in order to avoid compression of the PA. The amplified signal is then delivered to the transmit antenna 104 through duplexer 105. As discussed above with respect to FIG. 2, the transmit antenna provides an amplified and frequency shifted version of the desired signals d(t) received by the repeater indicated by 56. As discussed above, a time delay might also be implemented through delay components 134, such that the transmitted signal is also time shifted or delayed. For the sake of illustration, the error signal e[n] is not shown as part of the transmitted signals 56. When the cancellation circuit has converged, the error signal e[n] is small and will not significantly degrade the fidelity of the repeated signal.

Repeater 100 of the present invention provides digital signal processing and a frequency shift of the input signals to the repeater in order to de-correlate any feedback signals which may leak back or be fed back into the antenna 102 of the repeater. To that end, repeater 100 has a reference path 150, wherein the transmit signals are coupled off, utilizing a suitable coupler 150 to provide a reference signal on path 150. Since the feedback signal has been removed or reduced, the reference signal on path 150 is primarily the output of the repeater, which is the desired signal D[n] along with an error signal e[n]. In the reference path, the signals are then downconverted utilizing a mixer 154, with a suitable LO 155, a filter 156, and an A/D converter 158. A complex mixer 160 mixes the reference signals to DC, and decomposes the signal into its in-phase and quadrature components representing the complex envelope of the signal being transmitted. The signal is then decimated and filtered by circuit component 162. It may be necessary to also incorporate a time delay into the reference path 150 through delay elements 164 to mimic the delay in the signal path 108 up to the cancellation combiner 126, in order to provide accurate adaptation of filter 128 through the digital signal processing. FIG. 2A illustrates a reference path that is coupled off digitally as discussed above.

The digital signal processing circuitry 106 of the present invention includes a circuit for providing an adaptive filter algorithm 166 to adapt filter 128. As discussed herein, the term "digital signal processing" or "digital signal processor" is utilized to describe various of the circuits, circuit portions, circuit components, or devices that provide suitable processing of the digital signal for the purposes of implementing the invention. Thus, the term "digital signal processing" or "digital signal processor" is not limited to one particular component or circuit, or to one particular processing chip. Rather, those terms encompass any combination of different processing circuits and components for providing the desired processing of the digital signals, both as set forth in the embodiments described herein, and/or other similar equivalent circuits that might be utilized to implement the invention.

The adaptive algorithm circuit 166 has two inputs in the form of error signals 168, and reference signals 170. The error signals are taken from the downlink path 108, after the cancellation combiner 126, as discussed hereinabove with respect to FIG. 2, to provide an indication of the error in the signals after the input signals and signals from the filter 128 are combined, to remove or reduce the feedback. The error signal e[n] provides an indication of the effectiveness of the outputs 172 from filter 128 in removing the interference signals. The adaptive algorithm circuit 166, provided as part of the digital signal processor of the present invention, seeks to minimize the mean square value of the error signal e[n].

The adaptive algorithm circuit 166 might implement a suitable adaptive algorithm for adapting filter 128, such as a Least Mean Squares (LMS) algorithm. In one embodiment of the invention as disclosed herein, a normalized LMS algorithm is utilized. However, the present invention might incorporate other adaptive filtering algorithms, as there are many different ways of implementing such an adaptive filtering function, such as RLS (Recursive Least Square). In one embodiment of the invention, the LMS provides a robust algorithm that may be efficiently implemented in hardware. The update equation for the LMS is:

$$w(n+1) = w(n) + \mu \text{ref}(n) \text{err}(n)$$

Specifically, the next tap weights in the filter w(n+1) are equal to the previous tap weights times the reference vector times the error scaler err(n) at time [n]. The step size of the filter is provided by μ, which determines the convergence rate, the tracking performance, and the excess error at the output of the cancellation combiner 126. The objective of the LMS is to minimize the Mean Square Error (MSE). Therefore, the above equation is periodically computed to minimize MSE. This will occur when the transfer function H[n] best estimates the echo path h(t). Filter 128, in one embodiment of the invention, might be a suitable transversal filter, such as an FIR filter, with N taps with tap weights w(n). Other filters that may be suitable include an IIR filter or a frequency domain filter, such as an FFT-based filter. The adaptive algorithm circuit 166 provides the next tap weights as the filter is constantly updated and adapted. The filter also receives the reference signals 170 on reference path 150, and provides suitable outputs 172 to the cancellation combiner to be combined with the input signals of the repeater. Generally the output of the cancellation combiner would contain the desired signal D[n] and the echo component I[n] or essentially a frequency shifted version of the repeated signal convolved with the echo path transfer function H[n]. The mean square error is minimized when the output of the cancellation combiner 126 only contains the desired signal D[n]. An alternative way to view this is that the output of the transversal filter 128 contains only the interference signals, such as the echo signal 58. This signal is used to reduce or eliminate the echo signals. However, such a statement can only be true if the signals d(t) and i(t) are statistically de-correlated from each other. In the present invention, the frequency shift ΔF provides a mechanism for de-correlating d(t) and i(t). Filter 128 is adapted and updated in accordance with one aspect of the present invention so that its coefficients w(n) may be updated according to the adaptive algorithm circuit 166.

In accordance with one aspect of the present invention, the adaptive filter 128 has multiple taps to generate cancellation signals that cancel unwanted feedback signals with a wider delay spread as it would be required in case of reflections from surfaces at different distances. In that way, not only the direct feedback signal 30 is cancelled, but the entire echo with all possible multipaths between the two antennas 102 and 104 can be cancelled.

As discussed above, in one embodiment of the invention, a frequency shift ΔF is provided in the digital signal processing of a repeater signal in order to de-correlate feedback signals from the desired signals of the repeater. In an alternative embodiment of the invention, a time delay might also be utilized in combination with a frequency shift. Referring to FIG. 3, a time delay might be introduced into the repeater signal path by delay element 134. In accordance with one aspect of the present invention, a combination of a digital time delay, as well as a digital frequency shift, might be utilized to improve the de-correlation, and thus improve the operation of the repeater.

In accordance with another aspect of the present invention, repeater 100 incorporates control circuitry, or a control circuit 180, that can evaluate the input signals in the repeater and control the digital signal processing circuitry of the invention as well as the frequency shift provided by the complex mixer to tailor both adaptation of the filter as well as the frequency shifted signal in response to varying conditions around the repeater. In one embodiment of the invention, the control circuit 180 is configured to evaluate input signals, such as on lines 182, 183 to determine certain signal conditions, and thus control the adaptive algorithm circuit 166 (using line 184) or the complex mixer (using line 186) or the delay circuitry (using line 188).

In one embodiment of the invention, control circuit 180 evaluates the signals 183 to determine how much uplink traffic is being repeated by the repeater 100. The frequency shift may then be dynamically modulated based on the signal traffic level. This will provide an increase in the cancellation of the echo signal by reducing the correlation between the desired received signal D[n] and the echo signal.

In an alternative embodiment of the invention, the time delay in the repeater that is provided by delay circuits 134 might also be dynamically modulated to reduce correlation between the desired signals and the echo signals. It is desirable to keep the frequency shift of the present invention, and also any introduced time delay, as small as possible so that overall repeater performance is not degraded. In one embodiment of the present invention, the repeater detects when the repeater is not in use (little or no uplink traffic), and during that time the frequency shift of the repeater is increased to allow the adaptive algorithm circuit and filter to achieve optimum cancellation. Similarly, the time delay might also be increased, along with the frequency shift, for optimum cancellation.

For example, in a TDMA repeater, the uplink power might be measured during each time slot. If the repeater detects there is no uplink traffic, or a very small amount of uplink traffic, the repeater, through control circuit 180 and control lines 186, might increase the frequency shift ΔF to a larger amount. This allows the transfer function of the feedback to be precisely computed without degrading the system performance, since the system is not in use during this time. Similarly, through control lines 188, the time delay provided by block 134 might also be increased for the same purpose. When the repeater determines that the uplink traffic is increased, such as during the next time slot in a TDMA system, the repeater could go back to its normal operation, where a particular frequency shift and a particular time delay are minimized, but are still able to provide sufficient de-correlation.

Figure 4:
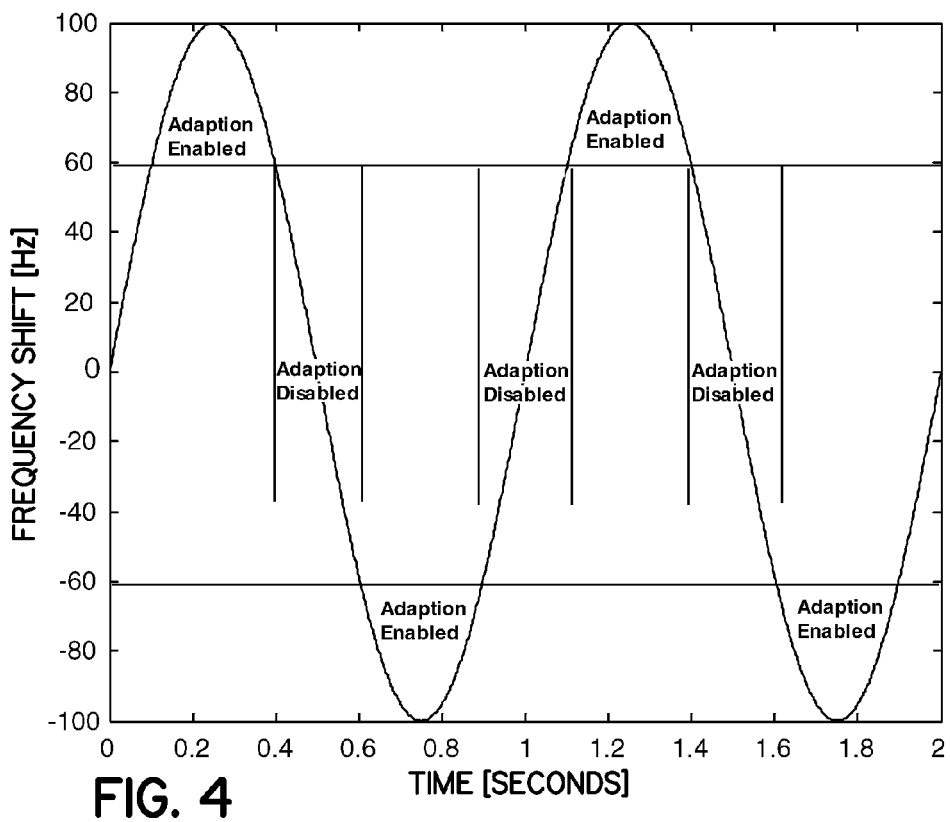
FIG. 4 is a schematic illustration of a periodically modulated frequency shift.

In accordance with another embodiment of the present invention, the control circuit 180 through lines 186 might provide a frequency shift that is modulated, or varied, in a periodic fashion. The time delay might be similarly periodically varied or modulated. For example, a sinusoidal variation of the frequency shift might be utilized. Referring to FIG. 4, a periodically modulated frequency shift is illustrated. By periodically time varying the frequency shift, the amount of time that the system is in a large frequency shift is reduced. This decreases the amount of time that the system performance is degraded. In accordance with one aspect of the invention, the control circuit 180 through lines 186 controls the complex mixer 136 to provide a periodic modulation of the frequency shift. Although a sinusoid function is illustrated herein, other periodic variations might also be utilized. Control circuit 180 also controls the adaptive algorithm circuit 166 through lines 184 such that the adaptation may be selectively enabled and disabled based upon the periodic modulation of the frequency shift. For example, the filter coefficients might only be adapted (adaptation enabled) when the frequency shift is large enough to de-correlate the echo signals from the other desired input signals. If not, the adaptation might be disabled or suspended (See FIG. 4). Therefore, control circuit 180 is configured to synchronize the adaptation of the adaptive digital filter 128 based on the periodic modulation of the frequency shift provided at the complex mixer 136. Similarly, in those embodiments of the invention wherein both a frequency shift and a time delay are dynamically modulated in the periodic manner, the control circuitry might also be configured to synchronize the adaptation of the adapted digital filter based on both the periodic variation of the frequency shift and the time delay.

Figure 5:
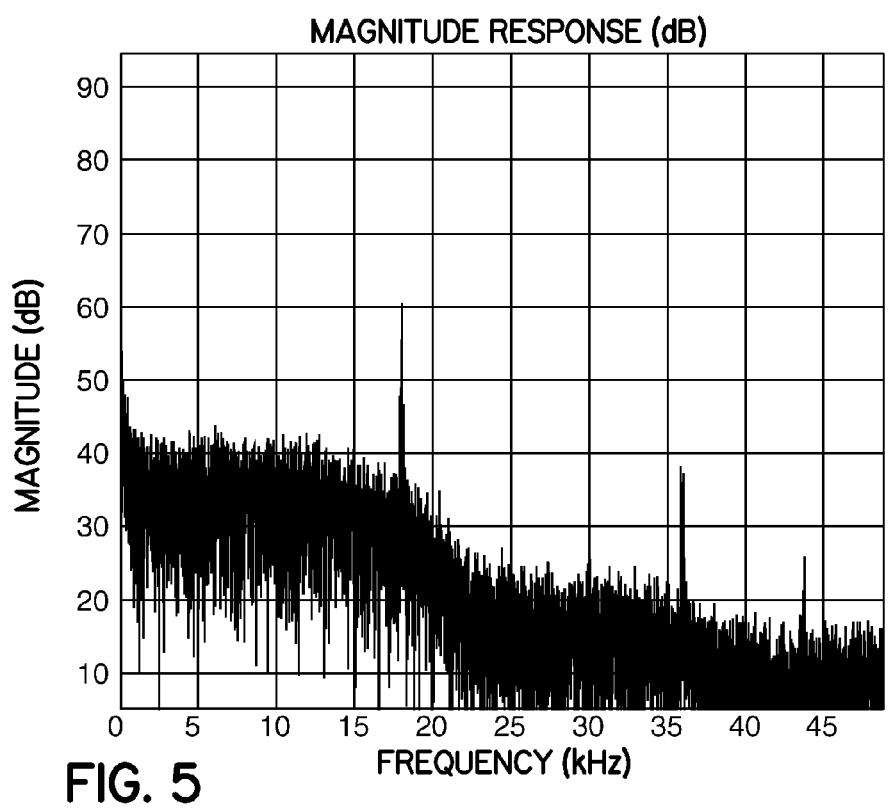
FIG. 5 is a schematic illustration of an error signal.

In accordance with another aspect of the present invention, the repeater performance might further be improved by monitoring the input signals of the repeater to determine when those signals are at multiples of the symbol rate frequency of the repeater and its repeated signals. Specifically, the control circuit 180, through monitoring the signals from lines 182, might determine the frequency at which both the input signals and the transmission or repeated signals of the repeater beat together. At those times, there is an increase in error in the repeater. For example, referring to FIG. 5, a system with a symbol rate of 18 kHz is illustrated, and it may be seen that there is an increase in the error at multiples of the symbol rate frequency (N*18 kHz, N=1, 2, 3 . . . ). The control circuitry 180 of the processing circuitry of the invention evaluates the input signals (lines 182) to determine the frequency of such signals, and when they might beat with the repeated signals or feedback signals. Control circuitry 180 then controls the adaptive algorithm circuit 166 to slow down, or completely pause, the adaptation of the adapted digital filter during the time when the signals beat together. In other words, the repeater may analyze the incoming signals and synchronize the adaptation mechanism 166 with the symbol rate of the incoming signals. When the signals beat together, the desired input signals and echo signals have high correlation. Therefore, the repeater of the present invention may slow down or pause the adaptation in real time, during times of such correlation, in order to compute a more optimum solution or minimal error. Even if the frequency shift is not an integer multiple of the symbol rate of the signal, the adaptation might need to be periodically activated. This can optimize and improve the adaptation speed in a time interval when the echo and the desired signal exhibit a phase shift of p*180 degrees (p being an odd integer number), which consequently temporarily increases the decorrelation. Adaptation is paused for even numbers of p.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A system for repeating signals, the system comprising:
at least one receive antenna for receiving input signals;
processing circuitry for processing the input signals to form repeated signals;
at least one transmit antenna for transmitting the repeated signals;
the processing circuitry including:
an adaptive digital filter configured to generate cancellation signals that are added to the input signals to attenuate feedback signals in the input signals;
a digital signal processor coupled to the adaptive digital filter and operable for adapting the filter;
the processing circuitry configured for modifying the repeated signals with respect to the received input signals to differentiate the repeated signals that are received as feedback from the input signals and configured for utilizing the modified repeated signals for de-correlating, from the input signals, the repeated signals that are received as feedback signals by the receive antenna;
a control circuit configured to dynamically modulate how the repeated signals are modified;
the digital signal processor using the de-correlation to adapt the adaptive digital filter.

2. The system of claim 1, the processing circuitry further comprising a frequency shifting circuit configured for modifying the repeated signals by adding a frequency shift to the repeated signals to form repeated signals that are frequency shifted from the input signals, the processing circuitry configured for utilizing the frequency shift of the repeated signals for de-correlating, from the input signals, repeated signals that are received as feedback signals.

3. The system of claim 1 wherein the adaptive digital filter has multiple taps to generate cancellation signals that attenuate feedback signals that have a plurality of path lengths.

4. The system of claim 1 wherein the adaptive digital filter is a FIR filter.

5. The system of claim 3 wherein the adaptive digital filter is configured to generate cancellation signals to address previous repeated signals that are received directly from the transmit antenna and previous repeated signals that are reflected from surfaces remote from the transmit antenna.

6. The system of claim 2 wherein the control circuit is configured to evaluate the input signals and determine the frequency at which the input signals and the repeated signals beat together, the control circuit operable for slowing down, in real time, the adapting of the adaptive digital filter during the time when the signals beat together.

7. The system of claim 2 wherein the control circuit is configured to evaluate the input signals and determine the frequency at which the input signals and the repeated signals beat together, the control circuit operable for pausing, in real time, the adapting of the adaptive digital filter during the time when the signals beat together.

8. The system of claim 1 wherein the processing circuitry is configured to evaluate the modification of the repeated signals and to synchronize the adaptation of the adaptive digital filter by the digital signal processor based on the modification.

9. The system of claim 1 wherein the control circuit is operable to determine the level of signal traffic in the system, the control circuit dynamically modulating the signal modification based on the signal traffic level.

10. The system of claim 2 wherein the processing circuitry further includes:
a delay element for introducing a delay to the input signals to form repeated signals that are both time delayed and frequency shifted from the input signals;
the processing circuitry configured for utilizing the time delay and the frequency shift of the repeated signals to adapt the adaptive digital filter.

11. The system of claim 10 wherein the processing circuitry is operable for de-correlating, from the input signals, repeated signals that are received as feedback signals using the time delay and frequency shift, the digital signal processor relying on this de-correlation to adapt the adaptive digital filter.

12. The apparatus of claim 1 wherein the digital signal processor is operable to determine if the modification of the repeated signals is sufficient to de-correlate the input signals and repeated signals, the digital signal processor adapting the adaptive digital filter if the modification is sufficient and not adapting the adaptive digital filter if the modification is not sufficient.

13. A circuit for reducing the effect of feedback signals in a signal repeating system that repeats input signals received by at least one receive antenna and transmits the repeated signals with at least one transmit antenna, the circuit comprising:
an adaptive digital filter configured to generate cancellation signals to be added to input signals to attenuate feedback signals in the input signals, the cancellation signals configured to cancel feedback signals received by the repeater apparatus along with the input signals;
a digital signal processor coupled to the adaptive digital filter and operable for adapting the filter;
processing circuitry configured for modifying the repeated signals with respect to the received input signals to differentiate the repeated signals that are received as feedback from the input signals and configured for utilizing the modified repeated signals for de-correlating, from the input signals, the repeated signals that are received as feedback signals by the receive antenna;
a control circuit configured to dynamically modulate how the repeated signals are modified;
the digital signal processor configured for utilizing the de-correlation to adapt the adaptive digital filter.

14. The circuit of claim 13 further comprising a frequency shifting circuit configured for modifying the repeated signals by adding a frequency shift to the repeated signals to form repeated signals that are frequency shifted from the input signals, the processing circuitry configured for utilizing the frequency shift of the repeated signals for de-correlating, from the input signals, repeated signals that are received as feedback signals.

15. The circuit of claim 13 wherein the adaptive digital filter has multiple taps to generate cancellation signals that cancel feedback signals that have a plurality of path lengths.

16. The circuit of claim 14 wherein the control circuit is configured to evaluate the input signals received by a signal repeating system and determine the frequency at which the input signals and the repeated signals beat together, the control circuit operable for slowing down, in real time, the adapting of the adaptive digital filter during the time when the signals beat together.

17. The circuit of claim 14 wherein the control circuit is configured to evaluate the signals received by a signal repeating system and determine the frequency at which the input signals and the repeated signals beat together, the control circuit operable for pausing, in real time, the adapting of the adaptive digital filter during the time when the signals beat together.

18. The circuit of claim 13 wherein the circuit is further configured to evaluate the modification of the repeated signals and to synchronize the adaptation of the adaptive digital filter based on the modification.

19. The circuit of claim 13 wherein the control circuit is operable to evaluate input signals to determine the level of signal traffic of the system, the control circuit dynamically modulating the signal modification based on the signal traffic level.

20. The circuit of claim 14 further comprising:
a delay element for introducing a delay to the input signals to form repeated signals that are both time delayed and frequency shifted from the input signals;
the processing circuitry configured for utilizing the time delay and the frequency shift of the repeated signals to adapt the adaptive digital filter.

21. A method of repeating signals comprising:
receiving input signals;
processing the input signals to form repeated signals;
transmitting the repeated signals;
the processing of the input signals including:
generating cancellation signals with an adaptive digital filter and adding the cancellation signals to the input signals to attenuate feedback signals in the input signals;
modifying the repeated signals with respect to the received input signals to differentiate the repeated signals that are received as feedback from the input signals;
utilizing the modified repeated signals for de-correlating, from the input signals, the repeated signals that are received as feedback signals by the receive antenna;
dynamically modulating how the repeated signals are modified;
utilizing the de-correlation to adapt the adaptive digital filter.

22. The method of claim 21 further comprising adding a frequency shift to the repeated signals to form repeated signals that are frequency shifted from the input signals, utilizing the frequency shift of the repeated signals for de-correlating, from the input signals, repeated signals that are received as feedback signals.

23. The method of claim 21 wherein the adaptive digital filter has multiple taps, the method including generating cancellation signals that attenuate feedback signals that have a plurality of path lengths.

24. The method of claim 22 further comprising determining the frequency at which the input signals and the repeated signals beat together and then at least one of slowing down or pausing, in real time, the adjusting of the adaptive filter during the time when the signals beat together.

25. The method of claim 21 further comprising synchronizing the adaptation of the adaptive digital filter with the modulation of the modification.

26. The method of claim 21 further comprising determining if the modification is sufficient to de-correlate the input signals and repeated signals and adapting the adaptive digital filter if the modification is sufficient and not adapting the adaptive digital filter if the modification is not sufficient.

* * * * *